United States Patent Office 3,186,828
Patented June 1, 1965

3,186,828
COATING COMPOSITIONS FOR
PARTICULATE MATERIALS
Robert E. Baarson, La Grange, Ill., and Duane T. Ohlsen, Eugene, Oreg., assignors to Armour and Company, Chicago, Ill., a corporation of Delaware
No Drawing. Filed May 4, 1962, Ser. No. 192,349
7 Claims. (Cl. 71—64)

This application is a continuation-in-part of our copending application, Serial No. 665,653, filed June 14, 1957, and our copending application, Serial No. 102,353, filed April 12, 1961, now abandoned.

This invention relates to coating compositions for particulate materials, and more particularly to compositions having unique properties in preventing caking, dusting, and other undesired characteristics in the materials. The compositions are useful for coating single component salts or particles as well as multiple component blends of hygroscopic particulate materials such as fertilizer components or aggregates, ammonium nitrate, ammonium sulfate, sodium nitrate, rock salt, sylvite, ammonium chloride, urea, sodium metaphosphate, zinc chloride, etc.

In one of its aspects, this invention relates to a non-caking mixed fertilizer composition in particulate form wherein the particles are substantially uniformly coated with a particular type of cationic reagent. In another of its aspects, this invention relates to a method for the production of a non-caking fertilizer composition wherein particles of mixed fertilizer are substantially uniformly coated with a small amount of a reagent containing a particular type of cationic chemical.

Caking during storage has long been a troublesome and annoying problem with chemical fertilizers. A chemical fertilizer can become so hard that farmers often refer to an 80 pound bag of caked fertilizer as a "tombstone" which they must break up with a sledge hammer in order to transfer its contents into a spreading machine. Even then, remaining clumps clog the spreading machine, preventing even application as well as causing lost time during hectic spring planting.

To the fertilizer industry, however, caking has caused economic problems as well. During curing, a pile of fertilizer may become so hard that blasting is required before it can be bagged. It also prevents the industry from storing its product indefinitely and from realizing the advantages of conventional bulk handling equipment such as is used by the grain industry.

Many solutions to this problem have been tried, some with a measure of success. Perhaps the most significant has been the recent trend toward granulating fertilizer. Granulation concentrates fertilizes into small particles of nearly uniform size ranging in diameter from 1 to 4 millimeters. With mixed materials, granulation prevents segregation of compounds and reduces their tendency to cake or become sticky. The improved anti-caking tendencies of granulated or pelletized fertilizer are probably produced entirely by the decreased contact area between particles.

However, granulation does not always produce an entirely free-flowing product. In the higher analysis, products such as 12–12–12 (that is, 12% nitrogen (N), 12% phosphorus pentoxide ($P_2O_5$), and 12% potassium oxide ($K_2O$)), the ideal of a free-flowing fertilizer is still out of reach even with graulation. Its hygroscopic salts absorb moisture from the air, producing a set in the bag. To make it more free-flowing, mineral dusts such as finely-divided clay, lime, magnesium oxide, vermiculite fines, and various similar materials have been used to coat the particle surface. From 10 to 20, and even as high as 50, pounds of such materials are needed per ton of fertilizer, and although some of these additives may show improved anti-caking, they reduce the concentration of the plant nutrients, resulting in a lower grade product.

Additional drying is sometimes effective in reducing anti-caking, but it increases capital investment if more equipment needs to be purchased, or it reduces plant capacity if recycling through present equipment is used. It also means increased fuel costs.

Several investigators have approached the problem from the standpoint of employing material such as oils, waxes, soaps and synthetic detergents such as sodium alkylaryl sulfonate. However, none of these reagents have appeared to be very effective, and the treated fertilizers have lost whatever anti-caking properties might have been originally imparted after a short period in storage.

In another of its aspects this invention is concerned with conditioning water-soluble salts or mixtures of such salts to prevent caking, a problem of varying intensity with producers of hygroscopic materials or blends thereof. Most generally, caking results either from adsorption of moisture from the atmosphere, or from moisture travelling to the surface from the core of a crystal or blended pellet, or a combination of both. Evaporation of this moisture as atmospheric conditions change causes the formation of a bridge between the particles as crystals fuse together. The result is particles adhering firmly to each other, producing the phenomenon known as caking. Conditions other than moisture and temperature changes which influence the caking of soluble materials include chemical make-up, methods of producing and/or curing, storage conditions, and particle size and shape.

Heretofore, agents employed to treat soluble, particulate materials to secure non-caking included oil-seed meals, hull meals, and similar natural organic residues; organic and inorganic industrial by-products, and natural inorganic materials such as clays, diatomaceous earths, lime, magnesium oxide and vermiculite. These materials vary markedly in size and in physical and chemical composition, but they have in common the characteristics of conditioning by preferential adsorption of water, and by the necessity for use in large amounts, usually 40 to 100 pounds per ton of product, and sometimes even more. These materials have met with varied success in commercial practice and results with the same conditioner are frequently erratic. Some of these products produce dusting problems, and all are used in sufficient quantity so that they lower the grade of high analysis products such as fertilizers.

Our compositions are particularly effective in conditioning single and multiple component fertilizers to secure non-caking thereof. By way of illustrating the outstanding properties of our compositions, therefore, their use in conditioning fertilizers will be discussed in greater detail.

In yet another aspect, the invention has to do with the coating of ammonium nitrate without sensitizing the material from the standpoint of increasing the tendency to detonate which usually accompanies the addition of organic materials to ammonium nitrate.

An object of the invention is to provide anti-caking and dusting agents for single-component as well as multiple-component blends of hygroscopic particulate materials. A further object is to provide compositions and processes for the treatment of particulate materials to prevent caking, dusting, and other undesirable characteristics therein, and, in the case of ammonium nitarte, etc., to provide the above-desired characteristics therein without sensitizing of the materials. Other specific objects and advantages will appear as the specification proceeds.

In one embodiment of the invention, we have provided a free-flowing, non-caking mixed fertilizer composition which is free from the problems of manufacture and commercial usage described above, even when the finished product contains a high percentage of moisture by ordinary standards. For the purpose of this invention, the term "mixed fertilizer" shall mean a mixture of two or more conventional fertilizer ingredients in particulate form. Conventional fertilizer ingredients consist of water-soluble inorganic salts such as acidified phosphate rock, viz., superphosphate, triple superphosphate and nitrated phosphate, ammonium sulfate, ammonium nitrate, sodium nitrate, potassium nitrate, and potash, viz., potassium chloride.

Granular mixed fertilizers are of two types, usually referred to as granular and semi-granular. The granular (or pellet or pebble) type may be either a mixture of all granular type fertilizer materials of approximately the same particle size, or it may be a mixture of ordinary fertilizer materials together with nitrogen solutions and/or anhydrous ammonia with one or more mineral acids (sulfuric and/or phosphoric). Such mixtures, when made, become damp and sticky, and when dried with heat, if necessary, form granular type fertilizers. The resulting product may be selectively screened, resulting in a product of desired particle size.

The semi-granular product results from mixing ordinary fertilizer materials together with the liquid named above for granular type. These mixtures usually do not require heat, other than the heat of chemical reaction, to produce a dry product. This product is not of uniform particle size and has a granular or "gritty" form because of the liquids which have been added, the salts formed by the reaction of these liquids coating and agglomerating the fine materials used in the mixture.

Thus, these granular or semi-granular fertilizers may be only a mixture of several materials; they might be a mixture of materials all coated with ammonia salts resulting from the action of ammoniacal liquid and acids; or they are sometimes made in a sufficiently wet state so that the resulting product is practically a chemical mixture and, when dried, each particle is substantially the same chemically as all others. The dried product may contain as little as 0.3 to as high as 3.0 and more percent moisture by weight. It will be understood that the present invention is not limited to any particular ratio or combination of mixed fertilizer ingredients.

Our improved non-caking mixed fertilizer composition consists essentially of a mixed fertilizer as defined hereinabove in granular or pelletized form in which the individual particles are substantially uniformly coated with a small amount, for example, between about 0.05 and about 4.0 pounds per ton, of an aliphatic amine material selected from the group consisting of amines having the formulae $RNH_2$ and $RNHCH_2CH_2CH_2NH_2$ wherein R is an aliphatic hydrocarbon radical containing from 8 to 22 carbon atoms, and the hydrochloric acid, acetic acid and higher fatty acid salts of the foregoing, said higher fatty acids containing between about 6 and 22 carbon atoms.

Examples of amines coming within the above definition include octylamine, decylamine, dodecylamine, tetradecylamine, hexadecylamine, octadecylamine, octadecenylamine, octadecadienylamine, octadecatrienylamine, eicosylamine, and mixtures of the foregoing such as are obtained by the ammonolysis dehydration and hydrogenation of the mixed fatty acids obtained from the hydrolysis of naturally occurring animal and vegetable fats such as coconut oil, soybean oil, tallow, cottonseed oil, and the like. Two particularly suitable mixtures are sold under the trade names Armeen S and Armeen T. Armeen T is a mixture containing approximately 2% tetradecylamine, 24% hexadecylamine, 28% octadecylamine and 46% octadecenylamine. Armeen S contains approximately 20% hexadecylamine, 17% octadecylamine, 26% octadecenylamine, and 37% octadecadienylamine.

Suitable aliphatic trimethylene diamines useful in accordance with the present invention are produced by the reaction between the specifically defined primary aliphatic amines mentioned above and acrylonitrile followed by the reduction of the nitrile group with hydrogen. Compounds of this type are sold under the trade name Duomeen. Duomeen T and Duomeen S are two preferred mixtures of aliphatic trimethylene diamines useful in accordance with the present invention and are produced by the addition of acrylonitrile followed by hydrogenation of the mixtures of primary aliphatic amines described above as Armeen S and Armeen T.

Acid salts of the foregoing primary aliphatic amines and aliphatic trimethylene diamines are also useful in the present invention, particularly the acetic acid, hydrochloric acid and higher fatty acid salts, that is, fatty acids containing from about 6 to 22 carbon atoms. Mineral acid salts such as the sulfuric acid and phosphoric acid salts of the foregoing compounds can be employed, but due to difficulties in their handling, they are not preferred.

In the preparation of our improved mixed fertilizer compositions, coating of the fertilizer particles is effected by contacting the untreated fertilizer particles with the aliphatic amine material under conditions which will promote uniform coating. Many of the amine materials described above are solids or viscous liquids at ordinary room temperature, usually depending upon the number of carbon atoms in the hydrocarbon chain, or the proportion of the shorter chain compounds with the longer chain compounds in admixture, so that it is referred to contact at elevated temperatures, for example, between about 150 and 250° F., in order to enhance the spreadability of the amine material. Since drying of the untreated fertilizer particles by heat is a conventional procedure, one preferred method of coating is to pre-heat the amine material to the approximate temperature of the particles leaving the dryer and then to thoroughly mix it with the particles before they have had time to cool considerably.

In addition to hot mixing, or when heat may be deleterious to the stability of the chemical, as in the case of amine acetates, we have found it expedient to employ the amine material in combination with a solvent and/or a surface active agent to enhance the coating of the particles with the amine. Examples of preferred solvents include mineral oil, kerosene, pine oil and aliphatic nitriles produced by the ammonolysis and dehydration of fatty acids containing from 6 to 22 carbon atoms and mixtures of such fatty acids resulting from the hydrolysis of naturally occurring oils such as soybean oil, tallow, coconut oil, cottonseed oil, etc. Particularly preferred solvents are sold under the trade names Arneel S and Arneel T. These materials consist of the mixed aliphatic nitriles resulting from the ammonolysis and dehydration of the mixed fatty acids resulting from the hydrolysis of soybean oil and tallow.

Examples of spreading agents which can be employed in combination with the amine materials described herein above include surface active materials such as mahogany soap, sodium or potassium alkylaryl sulfonates, fatty amine-ethylene oxide condensation products, as, for example, the primary aliphatic amines described above condensed with from 2 to 50 moles of ethylene oxide, polymers of ethylene oxide and propylene oxide, and condensation products of fatty acids with ethylene oxide. A particularly preferred spreading agent is sold under the trade name Ethofat 142/20 and is the condensations product of about 10 moles of ethylene oxide with 1 mole of a mixture of fatty acids containing about 50% oleic acid, 40% linoleic acid, 5% linolenic acid, and 5% rosin acids. Our experience has been that the use of a spreading agent is desirable when the mixed fertilizer particles contain moisture in normal or higher quantities. Although spreading agents can be employed when the fertilizer contains only a small quantity of moisture, the addition of a small amount of water tends to increase the spreadability of the coating agent.

As mentioned hereinbefore, the amine material used in accordance with the present invention to coat the mixed fertilizer material can be used either alone or in combination with a solvent or a spreading agent. Generally, the spreading agent lowers the interfacial tension between the hydrophobic amine material and the usually moist surface of the fertilizer pellets. The solvent solubilizes the amine material to form a liquid product at lower temperatures. Thus the reagent used to coat the mixed fertilizer particles will consist of from about 5 to 100% by weight of the amine material, preferably from about 25 to 75%, from 0 to 95% by weight of a solvent, preferably from about 25 to 75%, and from 0 to 15% of a spreading agent, preferably from 0.5 to 3%. The following compositions are exemplary of reagent compositions which are particularly useful in accordance with the present invention.

Composition:

| | Percent |
|---|---|
| Armeen S | 59 |
| Arneel S | 40 |
| Ethofat 142/20 | 1 |
| | |
| Armeen T | 59 |
| Arneel T | 40 |
| Ethofat 142/20 | 1 |
| | |
| Mixed crude amines consisting of: | |
| Armeen T | 60 |
| Secondary tallow amine | 20–30 |
| Amine polymers | 10–20 |
| | |
| Armeen S | 70 |
| Arneel S | 30 |
| | |
| Armeen S acetate | 59 |
| Arneel S | 40 |
| Ethofat 142/20 | 1 |
| | |
| Armeen S | 60 |
| Arneel T | 40 |
| | |
| Armeen T | 60 |
| Arneel T | 40 |
| | |
| Armeen S | 40 |
| Mineral Oil | 59 |
| Ethofat 142/20 | 1 |

In another modification of our invention, we have provided compositions of matter for treating particulate materials which when applied to such materials substantially overcome caking problems. These compositions find use not only in the fertilizer industry but wherever such problems are encountered. Our improved compositions consist essentially of (1) a cationic material selected from the group consisting of compounds having the formula $RNH_2$ and $RNHCH_2CH_2CH_2NH_2$ wherein R is an aliphatic hydrocarbon radical containing from 8 to 22 carbon atoms, and the hydrochloric acid, acetic acid and higher fatty acid salts of the foregoing, said higher fatty acids containing between about 6 and 22 carbon atoms, (2) a suitable solvent for said cationic material, and a spreading agent or surface active material selected from the group consisting of mahogany soap, sodium or potassium alkyaryl sulfonates, long chain quaternary ammonium compounds, fatty amine-ethylene oxide and propylene oxide condensation products and condensation products of fatty acids with ethylene oxide. These compositions display outstanding properties in being able to substantially uniformly coat materials in particulate form to secure not only non-caking thereof, but to impart other desirable characteristics thereto.

We prefer to employ the cationic materials in combination with a particular solvent or fluidizing compound and/or a spreading or surface active agent to enhance the coating of the particles of a particulate material. Examples of preferred solvents include mineral oil, kerosene, pine oil and aliphatic nitriles produced by the ammonolysis and dehydration of fatty acids containing from 6 to 22 carbon atoms and mixtures of such fatty acids resulting from the hydrolysis of naturally occurring oils such as soybean oil, tallow, coconut oil, cottonseed oil, etc. Particularly preferred solvents are sold under the trademark Arneel. Two such materials, Arneel S and Arneel T, consist of the mixed aliphatic nitriles resulting from the ammonolysis and dehydration of the mixed fatty acids resulting from the hydrolysis of soybean oil and tallow.

The surface active or spreading agents having special utility for the purposes of this invention include such materials as mahogany soap, sodium or potassium alkyaryl sulfonates, long chain quaternary ammonium compounds, fatty amine-ethyleneoxide condensation products, as, for example, the primary aliphatic amines described above condensed with from 2 to 50 moles of ethyleneoxide, polymers of ethyleneoxide and propyleneoxide, and condensation products of fatty acids with ethyleneoxide and propylene oxide. A particularly preferred material is sold under the trademark Ethofat and is the condensation product of ethylene oxide with a mixture of fatty acids containing about 50% oleic acid, 40% linoleic acid, 5% linolenic acid and 5% rosin acids. These surface active agents may be employed when a hygroscopic particulate material contains moisture, and, in fact, moisture may be added to the material to increase the spreadability of the coating compositions.

The concentrations of the individual components of our compositions range from about 5 to 95% by weight of the cationic material, preferably from about 25 to 75%, from 5 to 95% by weight of the solvent, preferably from about 25 to 75%, and from .5 to 20% of the surface active or spreading agent, preferably from 0.5 to 5%.

The quantities of our compositioins to be used for a particular purpose may vary considerably. When employed as anti-caking and anti-dusting agents, for example, in a fertilizer operation, between about 0.05 and about 4.0 pounds of composition per ton of fertilizer will substantially uniformly coat the individual particles and prevent dust formation. We have observed that in employing our compositions for their anti-caking properties, a weakening of the anti-caking effect occurs when the quantities of the compositions exceed an inital small amount necessary for complete free-flow. This decrease in effectiveness is believed to be related to the multi-layer coating effect achieved with our compositions. The initial coating is believed to place a hydrophobic coating on the particles of the material treated. Adsorption of the second layer of our compositions seems to orient the surface active, hydrophilic portion of the compositions outward with a potential for a variety of chemical reactions. It is surmised that additional layers of the compositions would then be alternately hydrophobic and hydrophilic with free-flow or caking characteristics, respectively. It is reasonable to assume that a variety of these conditions would exist in any system after the amount of the compositions necessary for initial coating has been exceeded, with the possibility that complete free-flow would be very difficult to secure again.

Our compositions may be used as anti-caking agents for single component as well as multiple component blends of hygroscopic particulate materials. Examples of single component salts in connections with which our compositions have utility for anti-caking purposes are sodium nitrate prills, rock salt, sylvite, ammonium chloride, ammonium sulfate and nitrate, urea, sodium metaphosphate and zinc chloride. Examples of multiple component salts successfully treated with our compositions are combinations of sylvite and ammonium sulfate, and granular mixed fertilizers of the following type: 17–7–0, 14–14–14, 10–10–10, 15–8–0, 15–0–15, 12–12–0 and 15–8–8.

The treatment or conditioning of particulate materials with our compositions is facilitated by the fact that for the most part our formulations are fluid or liquid at room temperature. They may, therefore, be sprayed or dripped onto particles without the need for constructing highly specialized equipment. In one fertilizer processing operation, for example, a simple tube siphon system was suitably located in the milling circuit with the composition being fed at room temperature from a pail.

In anti-caking operations, it is desirable that the particles or granules be completely coated to avoid bridging between uncoated sections of the particles. To assure complete coating while at the same time hastening the operation, it is preferred to apply heat to the particles undergoing treatment. Temperatures ranging between about 150 to about 250° F. are adequate to achieve this end. The upper limit on heating would be in the range 300–325° F., at which temperatures certain of the formulations would begin to degrade or would evaporate so rapidly that losses would be excessive.

Apart from their utility as anti-caking agents, our compositions can be employed to inhibit the liberation or formation of dust and fines in operations where this is a problem. It has previously been indicated that such problems exist in the fertilizer industry. Our compositions also find utility in the insecticide field as extenders or synergists. They have been successfully employed for this purpose with such widely-used insectcides as DDT, toxephane, parathion, and malathion. Insecticides treated with only small quantities, from 0.25 to about 1.0% by weight, for example, manifest a sharply increased kill with a concomitant increased life span for the insecticide.

The explanation of the marked success of our compositions in their varied uses are not known to us. When used as anti-caking agents, it is believed, as suggested hereinabove, that contact of our compositions with particulate materials results in placing a hydrophobic coating on the surface of the material, this action being significantly influenced by the solvent and surface active agent present in our compositions. A similar action is believed to occur in the alleviation of dust or fines formation employing our compositions. No theories have been evolved with regard to the outstanding results obtained with our compositions when used as extenders for insecticides.

The solvent and surface active agent (spreading agent) serve the very important function of reducing the consumption of the cationic material or reagent. When the reagent is applied, a relatively rapid reaction takes place which tends to fix or hold the reagent materials, thus increasing the consumption of the reagent. The solvent serving as a carrier for the amine and the spreading agent are together effective in applying the reagent uniformly over the particulate matter before substantial reaction occurs, thus resulting in a substantially reduced amount of the reagent employed. Use of the solvent alone, or the spreading agent alone, is beneficial in reducing the consumption of the reagent, but we prefer to employ both in combination with cationic material.

A still further aspect of the invention herein has to do particularly with ammonium nitrate. The presence of an organic carbon-containing coating on ammonium nitrate has been considered by safety experts as heightening ammonium nitrate's sensitivity to heat and shock. Generally speaking, the materials referenced are oils, paraffin waxes, etc. Repellent organic materials such as these produce a moisture barrier at about 1% in quantity, by weight of fertilizer. Since ammonium nitrate is an oxidizing agent and can support fire, and is a blasting agent when properly blended with a sensitizing ingredient and primed with a detonator, there is some concern in shipping. Several spectacular fires and explosions of ammonium nitrate coated with organics in the range of 1%, removed them from consideration as conditioning or anti-caking agents.

We have discovered that the compositions described herein, employing the amine material with a solvent and spreading agent, are effective in coating ammonium nitrate without substantially increasing the sensitivity thereof.

The following examples are presented as illustrative of the underlying principles of our invention and are not to be interpreted as unduly limiting thereof:

Example I

Test samples were prepared from a mixed and nodulized fertilizer containing 12% nitrogen (N), 12% phosphorous pentoxides ($P_2O_5$) and 12% potassium oxide ($K_2O$). 100 grams of the fertilizer material were heated to about 180° F. and placed in a one pound bottle, adding the reagent from a pipette. The bottle containing the pellets and reagent was then placed on rollers and tumbled for about 5 minutes. The sample was removed after mixing and placed in an oven and dried at about 180° F. for about 2 hours. If no moisture was added to the sample, the fertilizer was bottled with no further drying. If moisture was added in the process of coating, the sample was given a 2-hour drying period at 180° F. to remove excess moisture. In all the tests reported in Table I except those marked with an asterisk, 1% by weight of water was added to the fertilizer as received.

All samples were allowed to cool to about 100° F. before being placed in 4 ounce bottles and loosely capped. After standing undisturbed for varied times, viz., 24 hours, 48 hours, 72 hours, one week, two weeks, and one month, the bottles were slowly tipped and lightly tapped, if necessary, noting whether the pellets were free-flowing, caked, or partially caked. The following evaluation scale was used to describe the caking tendencies of the prepared samples:

| Grade No.: | Description |
|---|---|
| 1 | Completely free-flowing. |
| 2 | Slightly caked, pellets separate when bottle is inverted. |
| 3 | Caked, bottle requires light tap to separate pellets. |
| 4 | Firmly caked, bottle requires several taps to separate pellets. |
| 5 | Solidly caked, bottle requires several hard jars to separate pellets. |

NOTE: Some anti-caking results were estimated to be between the whole integers indicated and were designated by half intervals, as, for example, 1.5, etc.

The results of the foregoing tests are presented in tabular form in Table I following:

Table I

| Reagent composition | Pounds of reagent per ton of fertilizer | Evaluation grade No. (average of 24, 48 and 72 hr. storage tests) |
|---|---|---|
| Pellets as received* | | 4.0 |
| Pellets as received plus 1% water added* | | 3.0 |
| Armeen S—50% | 0.1 | 1.0 |
| Arneel S—49% | 0.2 | 1.0 |
| Ethofat 142/20—1% | 0.4 | 1.0 |
| | 0.5 | 1.0 |
| Armeen T—59% | 0.1 | 2.0 |
| Arneel T—40% | 0.2 | 1.0 |
| Ethofat 142/20—1% | 0.4 | 1.0 |
| Armeen T—59% | | |
| Arneel S—40% | 0.8 | 1.0 |
| Ethofat 142/20—1% | | |
| Armeen T—50% | | |
| Areeel T—49% | 0.2 | 1.0 |
| Ethofat 142/20—1% | 0.4 | 1.0 |

Table I—Continued

| Reagent composition | Pounds of reagent per ton of fertilizer | Evaluation grade No. (average of 24, 48 and 72 hr. storage tests) |
|---|---|---|
| Armeen C—59% / Arneel S—40% / Ethofat 142/20—1% | 0.2 | 1.0 |
| Armeen T—29% / Arneel S—70% / Ethofat 142/20—1% | 0.2 / 0.3 | 1.0 / 1.0 |
| Armeen T—29% / Arneel T—70% / Ethofat 142/20—1% | 0.2 | 1.0 |
| Armeen T—69% / Arneel T—30% / Ethofat 142/20—1% | 0.2 | 1.2 |
| (Vary Spreading Agent) | | |
| Armeen S—59% / Arneel S—40% / Ethofat 142/20—1% | 0.2 / 0.4 / 0.8 | 1.0 / 1.0 / 1.0 |
| Armeen S—59% / Arneel S—40% / (A) Arquad 2C—1% | 0.8 | 1.0 |
| Armeen S—59% / Arneel S—40% / (B) Petronate L—1% | 0.8 | 1.0 |
| Armeen S—59% / Arneel S—59% / (C) Ethomeen S/12—1% | 0.8 | 1.0 |
| Armeen S—59% / Arneel S—40% / (D) Ethomeen 18/25—1% | 1.2 | 1.1 |
| Armeen S—59% / Arneel S—40% / (E) Ethofat 60/20—1% | 0.8 | 1.1 |
| Armeen S—59% / Arneel S—40% / (F) Ethomid C/15—1% | 0.8 / 2.0 | 1.3 |
| Armeen S—59% / Arneel S—40% / (G) Arquad C—1% | 0.8 | 1.5 |
| (Vary Solvent) | | |
| Armeen T—10% / Kerosene—84.5% / Isopropyl—5% / Ethofat 142/20—1% | 0.4 / 1.0 / 2.0 | 1.5 / 1.0 / 1.0 |
| Armeen S—59% / Pine Oil—40% / Ethofat 142/20—1% | 0.4 / 0.8 | 1.0 / 1.5 |
| Armeen S—40.0% / Mineral Oil—49.0% / Ethofat 142/20—1% | 0.1 / 0.5 | 1.0 / 1.0 |
| (No Spreading Agent) | | |
| Armeen S—60% / Arneel T—40% | 0.4 | 1.0 |
| Armeen T—60% / Arneel T—40% | 0.4 | 1.0 |
| Armeen T—60% / Arneel S—40% | 0.4 / 0.8 | 1.0 / 1.8 |
| Armeen S—60% / Arneel S—40% | 0.4 / 0.8 | 1.0 / 1.7 |
| (Diamines) | | |
| Duomeen S—55% / Arneel S—40% / Duomeen T—Monooleate 5% | 0.4 | 1.2 |
| Duomeen T—20% / Arneel S—79% / Ethofat 142/20—1% | 2.0 / 4.0 | 3.0 / 1.0 |
| Duomeen T | 0.5 | 1.4 |
| Duomeen T monooleate | 0.8 / 2.0 | 1.0 / 1.5 |
| Duomeen S—55% / Arneel S—40% / Duomeen T dioleate—5% | 0.4 | 1.5 |
| Duomeen T monooleate—60% / Arneel S—40% | 0.8 | 1.1 |
| Duomeen S—59% / Arneel S—40% / Ethofat 142/20—1% | 0.8 | 1.0 |
| Duomeen T acetate (5% H₂O solution).* | 0.5 / 4.0 | 3.0 / 3.0 |
| (Mixed Crude Amines) | | |
| Mixed crude amine | 0.5 / 4.0 | 1.8 / 1.0 |
| Mixed crude amine—20% / Arneel S—79% / Ethofat 142/20—1% | 2.0 / 4.0 | 1.8 / 1.1 |
| Mixed crude amine—59% / Arneel S—40% / Ethofat 142/20—1% | 0.5 / 4.0 | 1.8 / 1.0 |
| (Miscellaneous) | | |
| Armeen T acetate (5% water solution).* | 0.25 / 1.0 | 3.0 / 3.0 |
| Armeen S | 0.5 | 2.0 |
| Armeen T | 0.5 / 4.0 | 2.0 / 2.0 |
| Armeen T (high test) | 0.4 | 1.0 |
| Armeen T—99% / Ethofat 142/20—1% | 0.4 | 1.0 |
| Oleylamine | 0.1 / 0.25 / 1.0 | 1.0 / 1.0 / 1.0 |
| Armeen 2 S—59% / Arneel S—40% / Ethofat 142/20—1% | 0.8 | 2.0 |
| Armeen S acetate—59% / Arneel S—40% / Ethofat 142/20—1% | 0.8 | 1.0 |
| Armeen S hydrochloride—59% / Arneel S—40% / Ethofat 142/20—1% | 0.8 | 1.5 |

A = Dicocodimethylammonium chloride.
B = Sodium salt of mixed petroleum sulfonates.
C = Condensation produce of primary soya amine with two moles of ethylene oxide.
D = Condensation product of octadecylamine with 15 moles of ethylene oxide.
E = Condensation produce of hydrogenated mixed fatty acids of tallow with 10 moles of ethylene oxide.
F = Condensation product of the amide of the mixed fatty acids of coconut oil with 5 moles of ethylene oxide.
G = Cocotrimethylammonium chloride.

EXAMPLE II 80 pound samples of a pelletized mixed fertilizer containing 12% nitrogen (N), 12% phosphorus pentoxide ($P_2O_5$) and 12% potassium oxide ($K_2O$), and containing from 0.35 to 1.75% moisture (Aver.—1.00%), were taken from the dryer discharge, at approximately 200–250° F. The 80 pound sample was dumped directly into a small concrete mixer, and the anti-caking reagent, at about 170° F., was poured onto the fertilizer sample while mixing. The mixing time was about 4 minutes, following the coating of the fertilizer, after which the pellets were dumped into a bag and the bag top sewed as in standard plant practice. Immediately following the coating of the fertilizer, it was sampled for laboratory evaluation. For storage evaluation, the bags of treated fertilizer were placed in stacks of two-deep on heavy kraft paper, placing 10 bags of untreated fertilizer on top of each bag. The stacks of bagged fertilizer were allowed to stand undisturbed in the warehouse for several weeks before an evaluation of the anti-caking tendencies was performed. After two weeks, the untreated bags of fertilizer were removed from the stacks, leaving the bags of treated fertilizer undisturbed. Each bag of treated fertilizer was carefully examined for bag set, then slit open and inspected for lumps of caked fertilizer, noting the size, hardness, and number of lumps in each bag. The bags were undisturbed before opening with the exception of a few bags which were found to have a very firm bag set. A few of these latter bags were dropped from a height of about three feet onto a concrete floor before opening to simulate normal handling conditions.

The results of these tests and their evaluation is set forth in tabular form in Table II following:

*Table II*

| Reagent composition | Pounds of reagent per ton of fertilizer | Lab evaluation of sample, percent free-flowing | Plant evaluation (Bag storage conditions) | | | |
|---|---|---|---|---|---|---|
| | | | No. of lumps and size | Lump hardness | Condition of material (cement) | Percent free-flowing |
| As received | No reagent | 50 | Bag set | Very hard | Very poor | 50 |
| Armeen T acetate (5% water) | 0.1 | 100 | 3—18″ | ------do------ | Poor condition | 40 |
| | 0.25 | 96 | 8—4″ | Hard | Fair condition | 60 |
| | 0.5 | 98 | 1—14″ | Medium | ------do------ | 60 |
| | 1.0 | 80 | None | | Almost perfect | 100 |
| Armeen T | 0.1 | -------- | 1—½″ | Medium | ------do------ | 100 |
| | 0.25 | 100 | 2—½″ | ------do------ | ------do------ | 100 |
| | 0.5 | 100 | 3—4″ | Soft | Fair condition | 70 |
| | 1.0 | 100 | 1—10″ | ------do------ | Good condition | 80 |
| Armeen S | 0.1 | -------- | 5—1″ | ------do------ | Almost perfect | 95 |
| | 0.25 | 75 | 1—12″ | Medium | Good condition | 75 |
| | 0.5 | 98 | None | | Perfect condition | 100 |
| | 1.0 | 92 | 1—12″ | Medium | Good condition | 75 |
| Oleylamine | 0.1 | -------- | 1—16″ | Soft | Fair condition | 60 |
| | [1] 0.1 | 100 | 1—1″ | ------do------ | Almost perfect | 100 |
| | 0.25 | 100 | 2—1″ | ------do------ | ------do------ | 100 |
| | 0.5 | 92 | 1—18″ | ------do------ | Fair condition | 50 |
| | 1.0 | 100 | 1—10″ | ------do------ | ------do------ | 50 |
| Mixed crude amines | 0.1 | 100 | 2—2″ | Medium | Almost perfect | 99 |
| | 0.25 | 100 | None | | Perfect condition | 100 |
| | 0.5 | 100 | 2—2″ | Soft | Almost perfect | 98 |
| | 1.0 | 100 | 2—½″ | ------do------ | ------do------ | 100 |
| Duomeen monooleate | 0.1 | 100 | None | | Perfect condition | 100 |
| | 0.25 | 100 | 10—½″ | Soft | Almost perfect | 100 |
| | 0.5 | 96 | 1—12″ | Medium | Good condition | 75 |
| | 1.0 | 88 | 2—8′ | Soft | ------do------ | 75 K |
| Mixed crude amines—99% Ethofat 142/20—1% | 0.1 | 98 | 1—18″ | ------do------ | Fair condition | 60 |
| | 0.25 | 100 | 1—12″ | ------do------ | ------do------ | 70 |
| | 0.5 | 100 | None | | Perfect condition | 100 |
| | 1.0 | 100 | 1—10″ | Soft | Good condition | 80 |
| Oleylamine—99% Ethofat 142/20—1% | 0.1 | 100 | 2—4″ | ------do------ | Almost perfect | 97 |
| | 0.25 | 100 | 1—16″ | Medium | Fair condition | 60 |
| | 0.5 | 100 | 1—10″ | Soft | Good condition | 80 |
| | 1.0 | 70 | 1—12″ | ------do------ | ------do------ | 75 |
| Oleylamine—80% Arneel S—20% | 0.25 | 80 | 1—16″ | Medium | Fair condition | 60 |
| | [2] 0.25 | 100 | None | | Perfect condition | 100 |
| | 1.10 | 100 | 1—16″ | Medium | Fair condition | 60 |
| Armeen S—70% Arneel S—30% | 0.1 | 100 | None | | Perfect condition | 100 |
| | 0.25 | 100 | ------do------ | | ------do------ | 100 |
| | 0.5 | 100 | 1—4″ | Soft | Almost perfect | 99 |
| | 1.0 | 98 | 1—14″ | ------do------ | Fair condition | 70 |
| Armeen S—60% Arneel S—40% | 0.5 | 90 | 1—12″ | Medium | Good condition | 75 |
| | 1.0 | 85 | 1—18″ | Med. hard | Fair condition | 50 |
| Armeen S—60% Arneel T—40% | 0.5 | 100 | None | | Perfect condition | 100 |
| | 1.0 | 100 | 3—1″ | Very soft | Almost perfect | 99 |
| Armeen T—60% Arneel T—40% | 0.5 | 100 | None | | Perfect condition | 100 |
| | 1.0 | 100 | ------do------ | | ------do------ | 100 |
| Armeen T—60% Arneel S—40% | 0.5 | 100 | ------do------ | | Perfect condition | 100 |
| | 1.0 | 88 | 1—18″ | Medium | Fair condition | 60 |
| Armeen S—50% Arneel S—49% Ethofat 142/20—1% | 0.1 | -------- | 1—4″ | Soft | Almost perfect | 99 |
| | 0.25 | 100 | 1—10″ | ------do------ | Good condition | 85 |
| | 0.5 | -------- | 1—8″ | ------do------ | ------do------ | 90 |
| | 1.0 | -------- | 1—2″ | ------do------ | Almost perfect | 97 |
| Armeen T—50% Arneel T—49% Ethofat 142/20—1% | 0.1 | 100 | None | | Perfect condition | 100 |
| | 0.25 | 98 | 1—6″ | Soft | Almost perfect | 95 |
| | 0.5 | 100 | 1—12″ | ------do------ | Good condition | 75 |
| | 1.0 | 98 | 1—12″ | ------do------ | ------do------ | |
| Armeen S—59% Arneel S—40% Arquad 2C—1% | 0.25 | -------- | 1—18″ | Medium | Fair condition | 50 |
| | [2] 0.25 | 88 | 4—1″ | ------do------ | Almost perfect | 100 |
| | 0.5 | 96 | 1—16″ | ------do------ | Fair condition | 60 |
| | 1.0 | 100 | None | | Perfect condition | 100 |
| Armeen S—59% Arneel S—40% Ethomeen S/12—1% | 0.25 | 88 | 1—20″ | Medium | Poor condition | 40 |
| | 0.5 | 69 | 2—10″ | ------do------ | Fair condition | 60 |
| | 1.0 | 75 | 1—16″ | Hard | ------do------ | 60 |
| Armeen S—59% Arneel S—40% Petronate-L—1% | 0.1 | [3] 100 | 1—3/18″ | Soft | ------do------ | 50 |
| | 0.25 | 88 | 2—8″ | Medium | Good condition | 85 |
| | 0.5 | 75 | 1—16″ | ------do------ | Fair condition | 60 |
| | 1.0 | [3] 100 | 2—3″ | Soft | Almost perfect | 97 |
| Duomeen S—59% Arneel S—40% Ethofat 142/20—1% | 0.1 | 88 | 4—1″ | Hard | ------do------ | 98 |
| | 0.25 | 100 | 1—12″ | Soft | Good condition | 75 |
| | 0.5 | 100 | None | | Perfect condition | 100 |
| | 1.0 | 100 | 1—14″ | Medium | Fair condition | 70 |

*Table II*—Continued

| Reagent composition | Pounds of reagent per ton of fertilizer | Lab evaluation of sample, percent free-flowing | Plant evaluation (Bag storage conditions) | | | |
|---|---|---|---|---|---|---|
| | | | No. of lumps and size | Lump hardness | Condition of material (cement) | Percent free-flowing |
| Armeen S—40% | 0.1 | 100 | 4—2″ | Very soft | Almost perfect | 97 |
| Mineral Oil—59% | 0.25 | 100 | None | | Perfect condition | 100 |
| Ethofat 142/20—1% | 0.5 | 96 | 1—3/16″ | Medium | Fair condition | 60 |
| | 1.0 | 94 | None | | Perfect condition | 100 |
| Armeen T—10% | 0.1 | 100 | do | | do | 100 |
| Kerosene—84.5% | 0.25 | 100 | 1—14″ | Medium | Fair condition | 70 |
| Isopropanol—5% | 0.5 | 100 | 1—14″ | Soft | do | 70 |
| Ethofat 142/20—1% | 1.0 | 100 | None | | Perfect condition | 100 |
| Armeen S—59% | 0.1 | 100 | 1—8″ | Medium | Good condition | 85 |
| Pine Oil—40% | 0.25 | 88 | 1—16″ | do | Fair condition | 60 |
| Ethofat 142/20—1% | 0.5 | 46 | None | | Perfect condition | 100 |
| | 1.0 | 100 | 1—14″ | Soft | Fair condition | 70 |
| Armeen S acetate—59% | 0.1 | 100 | None | | Perfect condition | 100 |
| Arneel S—40% | 0.25 | 100 | 1—14″ | Soft | Fair condition | 70 |
| Ethofat 142/20—1% | 0.5 | 100 | 2—1″ | do | Almost perfect | 95 |
| | 1.0 | 100 | 1—12″ | Medium | do | 97 |

[1] Dropped bag once.  [2] Bag dropped.  [3] Perfect condition after bag dropped.

EXAMPLE III

A series of tests were made as described in Example I employing a mixed fertilizer composition containing 15% nitrogen, 0% phosphate and 15% potash ($K_2O$). The results of these tests are set forth in Table III following:

*Table III*

| Reagent composition | Pounds of reagent per ton of fertilizer | Evaluation grade No. (average of 24, 48 and 72 hrs. storage tests) |
|---|---|---|
| As received | None | 5.0 |
| Armeen S—59% | 0.1 | 3.7 |
| Arneel S—40% | 0.25 | 3.3 |
| Ethofat 142/20—1% | 0.5 | 2.7 |
| | 1.0 | 2.5 |
| Armeen S—59% | 0.1 | 1.7 |
| Arneel S—40% | 0.25 | 1.0 |
| Ethofat 142/20—1% [1] | 0.5 | 1.0 |
| | 1.0 | 1.0 |
| Armeen S | 0.1 | 2.0 |
| | 0.25 | 2.5 |
| | 0.5 | 2.5 |
| | 1.0 | 1.7 |
| Armeen T | 0.1 | 2.8 |
| | 0.25 | 2.0 |
| | 0.5 | 2.2 |
| | 1.0 | 2.7 |
| Armeen S—40% | 0.1 | 3.7 |
| Mineral Oil—59% | 0.25 | 3.2 |
| Ethofat 142/20—1% | 0.5 | 2.3 |
| | 1.0 | 1.7 |
| Armeen S—40% | 0.1 | 2.7 |
| Mineral oil—60% | 0.25 | 2.5 |
| | 0.5 | 2.0 |
| | 1.0 | 1.9 |
| Armeen S—60% | 0.1 | 3.3 |
| Arneel S—40% | 0.25 | 2.7 |
| | 0.5 | 2.9 |
| | 1.0 | 2.7 |
| Mixed crude amines | 0.1 | 2.7 |
| | 0.25 | 2.3 |
| | 0.5 | 2.3 |
| | 1.0 | 1.8 |
| Armeen T (distilled) | 0.1 | 3.3 |
| | 0.25 | 3.0 |
| | 0.5 | 2.0 |
| Amine bottoms | 0.1 | 3.3 |
| | 0.25 | 2.7 |
| | 0.5 | 2.0 |
| | 1.0 | 2.0 |

[1] 0.5% water added to fertilizer before amine added. All other tests, material treated as received.

EXAMPLE IV 100 grams each of sodium nitrate prills, potash, and a combination of ammonium sulfate and potassium chloride crystals, were placed in 4 ounce sample bottles and heated to 180° F. until dry. The materials were then transferred to round, one-pound sample bottles and our compositions added (based on 0.25–1.0 pound of composition per ton of material treated) with a pipette or a hypodermic syringe. The sample bottles were then placed on rollers and rolled for 5 minutes to secure coating of the particles with the composition. After rolling, the materials were removed from the round sample bottles and placed in 4 oz. sample bottles. To induce caking, the uncapped bottles were stored for 1 hour in a humidity cabinet having a 93% humidity at 110° F. The sample bottles were then removed from the cabinet and capped. Each bottle was thoroughly shaken and allowed to stand undisturbed at room temperature for time periods of 24 hours, 48 hours, and 72 hours. After each of these intervals the bottles containing the samples were slowly inverted and tapped (if necessary) to loosen the sample. The same evaluation scale as set out in Example I was used to describe the caking tendencies of the samples.

*Table IV*

| Reagent composition | Pounds of reagent per ton of fertilizer | Evaluation grade No. (average of 24, 48 and 72 hrs. storage tests) |
|---|---|---|
| Armeen S—39.5% | 0.1 | 1.0 |
| Mineral Oil—60.0% | 0.2 | 1.0 |
| Ethofat 142/20—0.5% | 0.4 | 1.0 |
| Armeen S—59.0% | 0.1 | 1.0 |
| Arneel S—40.0% | 0.2 | 1.0 |
| Ethofat 142/20—1.0% | 0.4 | 1.0 |
| Armac S—59.0% | 0.1 | 1.0 |
| Arneel S—40.0% | 0.2 | 1.0 |
| Ethofat 142/20—1.0% | 0.4 | 1.0 |
| Armeen T—10.0% | 0.1 | 1.0 |
| Kerosene—89.0% | 0.2 | 1.0 |
| Ethofat 142/20—1.0% | 0.4 | 1.0 |
| Armeen S—HCl—59.0% | 0.1 | 1.0 |
| Arneel S—40.0 | 0.2 | 1.0 |
| Ethofat 142/20—1.0% | 0.4 | 1.0 |
| Materials as received | | [1] 4.0 |

[1] Average.

A significant feature of the present invention is that it provides anti-caking properties at high moisture contents. Because untreated mixed fertilizer cakes more rapidly as the moisture increases, fertilizer producers have felt that if a moisture content of 0.5% could be attained on the finished product, there would be no serious caking problem. The goal of 0.5% moisture is usually economically unsound because in order to produce such a low moisture content the plant would be required to expand its drying facilities or greatly decrease its production (approximately 50%), both of which would increase the fuel consumption per ton of fertilizer dried and decrease the fertilizer tonnage produced per day.

Even if such a product could be produced economically, it would require protection from atmospheric moisture because the hydroscopic salts present in mixed fertilizer would not be inhibited from absorbing moisture from the air except by packaging in a moisture-proof bag. We have found that our improved fertilizer can contain as high as 3% moisture and still have commercially practical anti-caking properties.

EXAMPLE V

Tests were made in a series for evaluating the use of the cationic material with a solvent and spreading agent upon ammonium nitrate to determine its effect upon detonation level or explosive sensitivity. The following compositions were used:

Armoflo 21:
    40% Armeen 18
    59% Mineral oil
    1% Ethofat 142/20
Armoflo 65:
    40% Armeen O
    59% Mineral oil
    1% Ethofat 142/20
Armoflo 66:
    30% Armeen HT
    69% Mineral oil
    1% Ethofat 142/20

The results of the sensitivity tests are set out in the following table:

Table V
EXPLOSIVE SENSITIVITY OF AMMONIUM NITRATE SAMPLES

| Sample | Treatment | No. of tests | 50% detonations (grains/ft. Primacord) |
|---|---|---|---|
| 1. Uncoated AN prills | Screened (+20M) | 24 | 505 |
| 2. Uncoated AN prills | Screened (fines, −20M) | 26 | 305 |
| 3. Uncoated AN prills | Unscreened | 75 | 450 |
| 4. Uncoated AN prills | Ground (−200M) | 10 | 350 |
| 5. Coated AN prills | 2½ lb./t. Armoflo 21 | 30 | 485 |
| 6. Coated AN prills | 1 lb./t. Armoflo 21 | 18 | 440 |
| 7. Coated AN prills | 5 lb./t. Armoflo 21 | 82 | 435 |
| 8. Coated AN prills | 10 lb./t. Armoflo 21 | 70 | 350 |
| 9. Coated AN prills | 1 lb./t. Armoflo 66 | 45 | 385 |
| 10. Coated AN prills | 2 lb./t. Armoflo 66 | 29 | 315 |
| 11. Coated AN prills | 1 lb./t. Armoflo 65 | 38 | 340 |
| 12. Coated AN prills | 2 lb./t. Armoflo 65 | 29 | 310 |
| 13. Coated AN prills | ½ lb./t. Armoflo 65; 10 lb. clay | 30 | 505 |
| 14. Coated AN prills | 1 lb./t. Armoflo 65; 20 lb./t. clay | 32 | 500 |
| 15. Coated AN prills | 40 lb./t. oil | | 120 |
| 16. Coated AN prills | 120 lb./t. oil | | 200 |
| 17. Coated AN prills | #8 cap | | 80 |
| 18. Uncoated AN prills | #6 cap | | 50 |

With Armoflo 21, at levels of 1–10 lb./t., it is found that there is no significant reduction of 50% detonation level figures.

The above tests further indicate that improved results were obtained by the composition and that unusually good results were obtained by the use of the composition with clay.

While this invention has been described and exemplified in terms of its preferred embodiments, those skilled in the art will appreciate that modifications can be made without departing from the spirit and scope of the invention.

We claim:

1. An improved non-caking salt composition, comprising hygroscopic water-soluble salt particles having a substantially uniform anti-caking coating of a cationic material selected from the group consisting of compounds having the formula $RNH_2$ and $RNHCH_2CH_2CH_2NH_2$, wherein R is an aliphatic hydrocarbon radical having from 8 to 22 carbon atoms, and the hydrochloric, acetic and fatty acid salts of the foregoing compounds, said fatty acids containing from 6 to 22 carbon atoms, and an organic solvent for said cationic material, said coating constituting from about 0.05 to about 4.0 pounds per ton of the composition.

2. An improved non-caking fertilizer composition, comprising a mixture of water-soluble fertilizer ingredients in particulate form, the particles of said mixture having a substantially uniform anti-caking coating of a cationic material selected from the group consisting of compounds having the formula $RNH_2$ and $$RNHCH_2CH_2CH_2NH_2$$

wherein R is an aliphatic hydrocarbon radical having from 8 to 22 carbon atoms, and the hydrochloric, acetic and fatty acid salts of the foregoing compounds, said fatty acids containing from 6 to 22 carbon atoms, and an organic solvent for said cationic material, the thus-coated particles resulting in a substantially free-flowing, non-caking, multiple ingredient fertilizer composition, said coating constituting from about 0.05 to about 4.0 pounds per ton of the composition.

3. An improved non-caking fertilizer composition, comprising a mixture of water-soluble fertilizer ingredients in particulate form, the particles of said mixture having a substantially uniform anti-caking coating of an amine having the formula $RNH_2$ wherein R is an aliphatic hydrocarbon radical having from 8 to 22 carbon atoms, and an organic solvent for said cationic material, the thus-coated particles resulting in a substantially free-flowing, non-caking, multiple ingredient fertilizer composition, said coating constituting from about 0.05 to about 4.0 pounds per ton of the composition.

4. An improved non-caking fertilizer composition, comprising a mixture of water-soluble fertilizer ingredients in particulate form, the particles of said mixture having a substantially uniform anti-caking coating of a compound having the formula $RNHCH_2CH_2CH_2NH_2$, wherein R is an aliphatic hydrocarbon radical having from 8 to 22 carbon atoms, and an organic solvent for said cationic material, the thus-coated particles resulting in a substantially free-flowing, non-caking, multiple ingredient fertilizer composition, said coating constituting from about 0.05 to about 4.0 pounds per ton of the composition.

5. An improved non-caking salt composition, comprising hygroscopic water-soluble salt particles having a substantially uniform anti-caking coating of a cationic material selected from the group consisting of compounds having the formula $RNH_2$ and $RNHCH_2CH_2CH_2NH_2$, wherein R is an aliphatic hydrocarbon radical having from 8 to 22 carbon atoms, and the hydrochloric, acetic and fatty acid salts of the foregoing compounds, said fatty acids containing from 6 to 22 carbon atoms, an organic solvent for said cationic material, and a surface-active agent selected from the group of compounds consisting of mahogany soap, sodium and potassium alkylaryl sulfonates, long chain quaternary ammonium compounds, fatty amine-ethylene oxide and propylene oxide condensation products, and condensation products of primary aliphatic fatty acids with ethylene oxide and propylene oxide, said coating constituting from about 0.05 to about 4.0 pounds per ton of the composition.

6. An improved ammonium nitrate composition, comprising ammonium nitrate in particulate form having a coating consisting of an organic solvent, a surface-active spreading agent, and an anti-caking cationic material selected from the group consisting of compounds having the formula $RNH_2$ and $RNHCH_2CH_2CH_2NH_2$, wherein R is an aliphatic hydrocarbon radical having from 8 to 22 carbon atoms, and the hydrochloric, acetic and fatty acid salts of the foregoing compounds, said fatty acids containing from 6 to 22 carbon atoms, the thus-coated particles resulting in a substantially free-flowing and substantially non-sensitized ammonium nitrate composition, said coating constituting from about 0.05 to about 4.0 pounds per ton of the composition.

7. A composition according to claim 1 in which the coating constitutes from about 0.1 to 1.0 pound per ton of the composition.

References Cited by the Examiner
UNITED STATES PATENTS

| | | | |
|---|---|---|---|
| 2,490,924 | 12/49 | Schertz | 71—2.3 |
| 2,558,762 | 7/51 | Kohr | 71—2.6 X |
| 2,614,917 | 10/52 | Zukel et al. | 71—2.3 |
| 2,702,747 | 2/55 | Studebaker | 71—64 |
| 2,797,982 | 7/57 | McKinney | 252—384 X |
| 2,883,298 | 4/59 | Meadows | 71—64 X |
| 2,900,411 | 8/59 | Harwood et al. | 71—2.6 |
| 2,982,665 | 5/61 | Wilcox | 71—64 |
| 3,065,066 | 11/62 | McRae et al. | 71—2.3 |

ANTHONY SCIAMANNA, *Examiner.*

DONALL H. SYLVESTER, *Primary Examiner.*